United States Patent
de Oliveira

(10) Patent No.: US 6,657,839 B2
(45) Date of Patent: Dec. 2, 2003

(54) PROTECTIVE RELAY

(75) Inventor: Roberto Pinto de Oliveira, Paulo (BR)

(73) Assignee: Tyco Electronics Corporation, Middletown, PA (US)

( * ) Notice: Subject to any disclaimer, the term of this patent is extended or adjusted under 35 U.S.C. 154(b) by 49 days.

(21) Appl. No.: 09/931,321

(22) Filed: Aug. 16, 2001

(65) Prior Publication Data

US 2002/0024784 A1 Feb. 28, 2002

Related U.S. Application Data

(60) Provisional application No. 60/227,829, filed on Aug. 25, 2000.

(51) Int. Cl.[7] .............................. H02H 3/20; H02H 3/42
(52) U.S. Cl. ........................ 361/91.6; 361/91.6; 361/84
(58) Field of Search .............................. 361/84, 91.6, 82, 361/93.7, 93.9

(56) References Cited

U.S. PATENT DOCUMENTS

| | | | | |
|---|---|---|---|---|
| 4,320,309 A | * | 3/1982 | Griffiths et al. ............ | 307/132 T |
| 5,453,929 A | * | 9/1995 | Stove ............................ | 701/1 |
| 5,519,557 A | * | 5/1996 | Kopera et al. ................ | 361/84 |
| 5,519,559 A | * | 5/1996 | Dides et al. .................. | 361/84 |
| 6,072,679 A | * | 6/2000 | Myong ........................ | 361/93.7 |
| 6,133,645 A | * | 10/2000 | Scribner et al. ............. | 307/9.1 |
| 6,256,185 B1 | * | 7/2001 | Maller ........................ | 361/152 |
| 6,349,022 B1 | * | 2/2002 | Myong et al. ............. | 361/93.1 |

FOREIGN PATENT DOCUMENTS

| | | | | |
|---|---|---|---|---|
| DE | 39 34 503 A1 | 4/1991 | ............ | H02H/3/18 |
| DE | 197 02 116 A1 | 7/1998 | ............ | H02H/3/18 |
| GB | 2 336 481 A | 10/1999 | ............ | H02H/5/04 |

* cited by examiner

*Primary Examiner*—Gregory J. Toatley, Jr.
*Assistant Examiner*—Danny Nguyen

(57) ABSTRACT

A protective relay is provided to protect circuitry against reverse battery polarity or load dump, wherein a relay coil is operatively connected to a contact switch and is fed by a reverse bias diode (which may be a Zener diode) such that the relay coil opens the switch contact when the diode is energized to protect the circuitry; wherein the protective relay optionally includes a positive temperature coefficient resistor or a current source to protect the relay coil from overheating.

7 Claims, 4 Drawing Sheets

PROTECTIVE RELAY

This application claims benefit of provisional application No. 60/227,829 filed Aug. 25, 2000.

FIELD OF THE INVENTION

The present invention relates to protective relays protecting circuitry subjected to a battery connected to the circuit with reverse polarity and against damage caused by over voltages and "load dump." "Load dump" occurs upon sudden disconnection of a depleted battery from a motor vehicle electrical system. The invention is particularly advantageous in automotive applications.

BACKGROUND OF THE INVENTION

Utilization of solid state smart power switches is increasing in automotive applications. The vast majority of these components are built around a power MOSFET transistor and auxiliary circuits. When properly employed, these power MOSFETS are extremely reliable, supporting over-current, over-temperature, etc.

However, a major weakness of the power MOSFET surfaces when the device is operated under reverse battery condition. In this situation, the parasitic diode formed in the MOSFET construction conducts, turning on the loads connected to them with potentially harmful results such as short circuit of the supply lines, blown fuses or damage to the wiring harness. In some cases, there is no damage to the majority of the circuit, but the switch destroys itself due to the fact that the reverse conductive current capacity is lower than the forward conductive current capacity.

A popular solution is to put a diode in series with the portion of the circuit to be protected, often an electronic module within the automobile, in order to block the current caused by the reverse voltage. Unfortunately, this solution is only practical for Low-power modules. For modules requiring higher power, the diode would need to be extremely large and expensive.

One solution for high-power modules is to mount a diode in anti-parallel with each MOSFET switch in order to shunt excess reverse current. Another solution is to put one diode in series with each individual switch so as to block current in a reverse voltage situation because of the reverse bias of the diode. Unfortunately, in this case the forward bias voltage drop of the diode, during normal operation, will result in heat dissipation and will reduce the voltage available to the load. And, whereas the first solution does not interfere with the normal operation of the circuit, it can cause overheat problems in cases of prolonged exposure to the reverse battery condition. In addition to their limited effectiveness, these additional protective components also increase size and cost of electronic modules. Further, both solutions do not add any improvement to the operation of the circuits during normal operation (i.e., proper battery connection). These protective components are only beneficial in the limited circumstance of reverse battery connection.

DETAILED DESCRIPTION OF THE INVENTION

The description below uses exemplary voltages used in automobiles (i.e., 12 or 24 volts). These voltages are for illustration only and the invention is not to be understood as applying only to these particular voltages. Rather, the invention is to be understood as applicable to systems of any desired voltage, depending upon its end use requirements.

Figure 1:
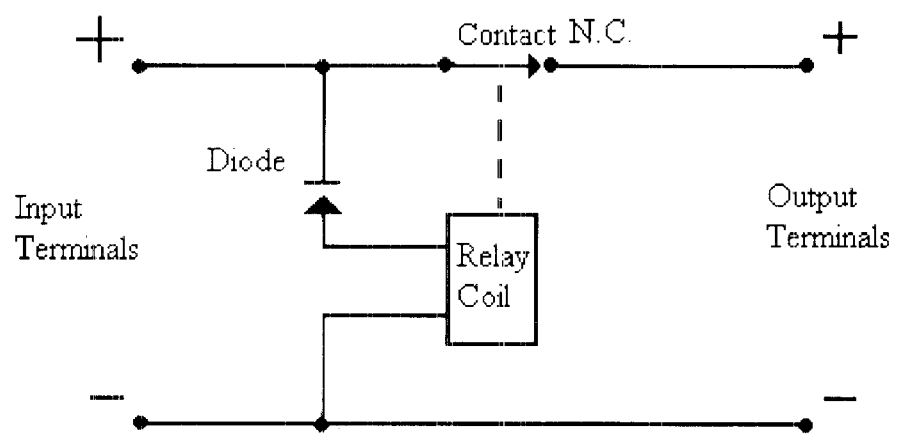
FIG. 1 is a circuit diagram of an embodiment of the present invention.
Figure 2:
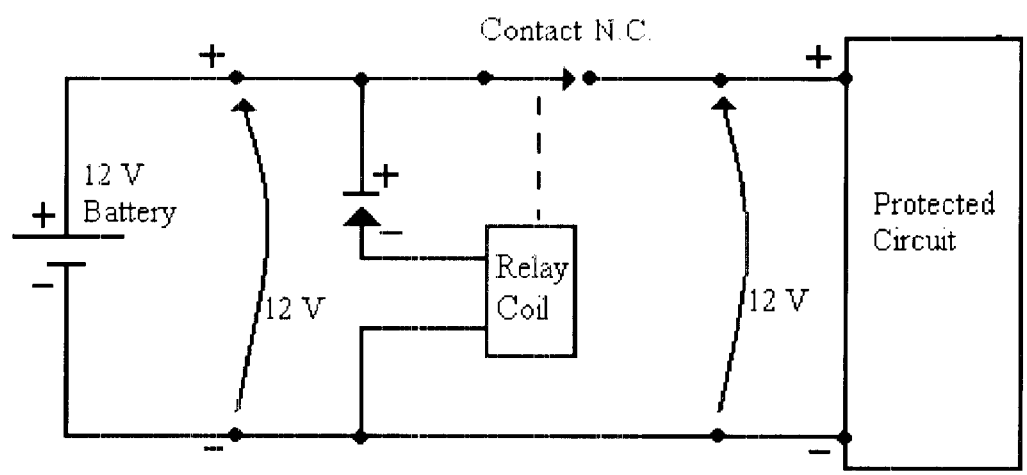
FIG. 2 is the circuit of FIG. 1 connected to a 12 volt power source and a block representation of a circuit to be protected wherein the 12 volt battery is connected to the circuit with the proper polarity.
Figure 3:
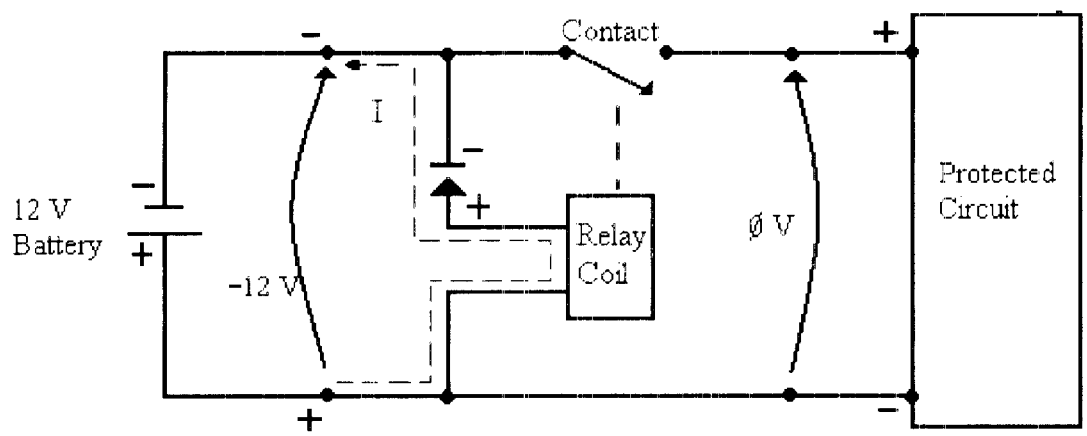
FIG. 3 shows the circuit of FIG. 2 wherein the 12 volt battery is connected with reverse polarity.

The present invention proposes a low cost active protection system comprising a relay with a contact and a small diode. FIG. 1 shows a coil relay having a normally closed contact in series with the output terminals, which, as shown in FIG. 2, are connected to a circuit that is to be protected. The relay coil is connected to the supply terminal through a small diode wired with a reverse bias relative to the power supply. When a battery is connected with the proper polarity, the diode is reverse biased, no current flows into the coil and the relay is not energized. Accordingly, current will flow through the normally closed contact ("Contact N.C.") and will feed the remainder of the circuit. When a power supply is inadvertently connected with reverse polarity, the diode will conduct so that current (represented in FIG. 3 by the dotted-line path 1) will flow through the coil thereby energizing the relay and opening the contact. No current will flow through the now open contact and the load will be effectively disconnected from the power source thereby protecting it. FIGS. 2 and 3 illustrate operation of the circuit in a proper battery connection and reverse battery connection, respectively.

An advantage of this solution is that no power loss occurs when the circuit is operated under proper battery conditions. In this condition, the diode is not conducting and the contact has only a few milliohms of resistance, thereby generating very low losses. And, although these automotive circuits are frequently aimed for high current carrying applications, because the relay will seldom be actuated, the relay's contacts need not be oversized. This reduces cost and size of the components needed to protect the circuit.

One perceived problem with this invention is unique to the automotive industry. That is, the most likely reversed battery condition is caused when maintenance is being performed on the vehicle or due to a failure in the battery or in the vehicle's electrical system. In these situations, it is possible that the reverse voltage may be so low that it is insufficient to actuate the relay. This is more a problem in theory than in practice. Although the reverse voltage may be too low to actuate the relay, current resulting from this lowered reverse voltage will also be insufficient to cause any meaningful damage to the circuit. Still, it may be advisable to increase the operating voltage range of the protective device. This could be accomplished by using a low operating voltage relay. For 12 volt systems, a comfortable operating voltage would be, for example, in the 6 to 24 volt range and, for 24 volt systems, for example, a 6 to 32 volt range would be appropriate.

Figure 4A:
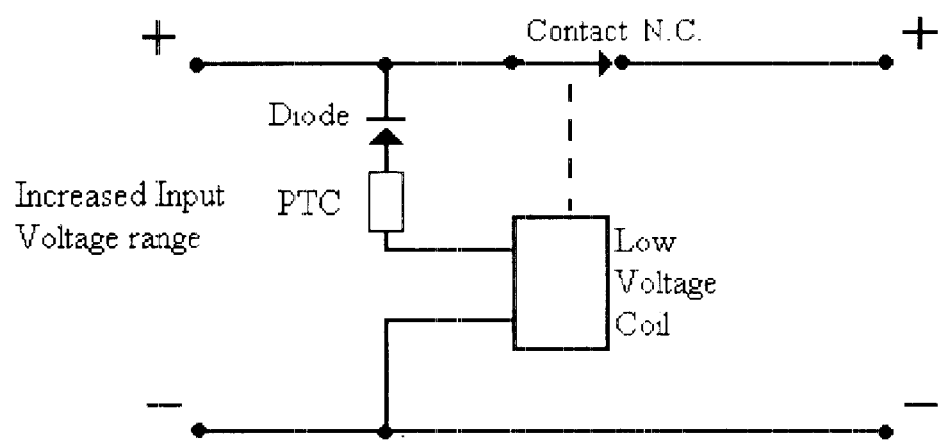
FIG. 4A shows the circuit diagram of FIG. 1 wherein a positive temperature coefficient resistor is connected in series with a diode and a relay coil.
Figure 4B:
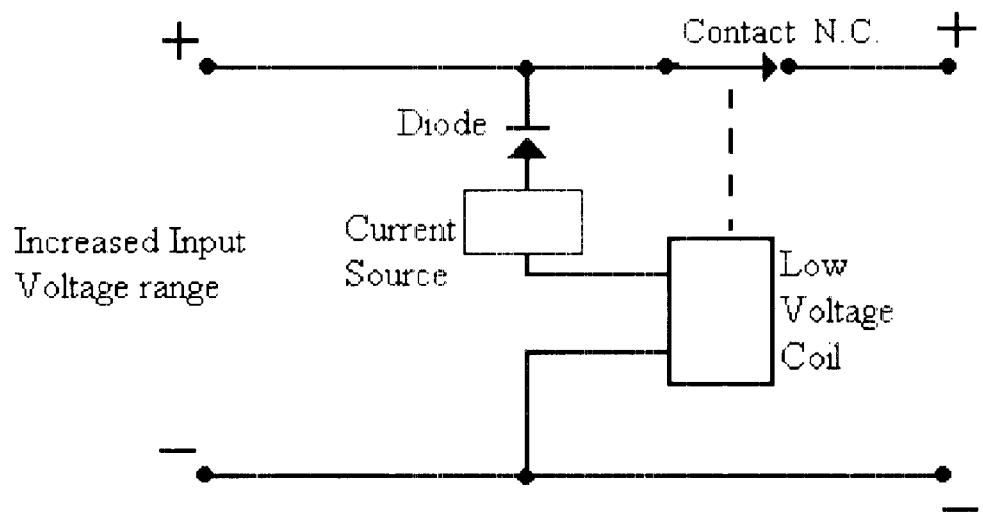
FIG. 4B illustrates the circuit diagram of FIG. 4A wherein the positive temperature coefficient resistor is replaced by a current source.

As shown in FIGS. 4A and 4B, coil overheating, if necessary, may be prevented by using a device to limit the coil current under normal battery voltage level or when the circuit is exposed to higher voltages. For example, FIG. 4A shows a positive temperature coefficient resistor (labeled "PTC" in the Figures) to limit the current through the coil and thereby prevent overheating. PTC resistors, such as Raychem® POLYSWITCH® devices, are inexpensive and readily available. FIG. 4B shows another possible approach using a current source in series with the coil in order to control current flow through the relay. This too is an effective prevention for overheating of the relay.

Another advantage of the present invention is that it can also protect against over voltages and "load dump." In an automobile, over voltage normally occurs in the case of failure of the alternator or voltage regulator. The on board voltage rises for example from 13.8V (normal level) to 20V or more (fault level). Load dump is a disturbance that appears in a vehicle's electrical system when a battery cable is disconnected, particularly if the battery is depleted and the engine/alternator is running at high speed. This disturbance or transient generates a voltage peak of 80 to 200 volts that last for 500 milliseconds. Associated with the voltage peak is substantial energy, which can cause severe damage to devices in the circuit that are not protected against such spikes. Prior to the present invention, protecting against such problems was an expensive endeavor that did not result in a return in performance to the customer.

Figure 5:
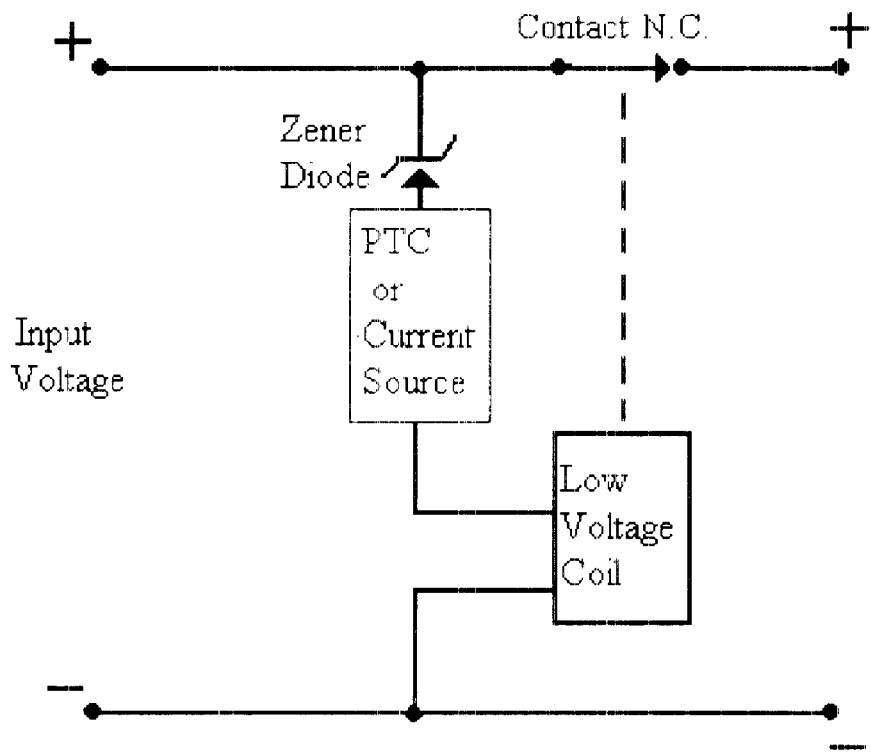
FIG. 5 illustrates the circuit diagram of FIG. 4A or FIG. 4B wherein the traditional diode is replaced with a Zener diode.
Figure 6:
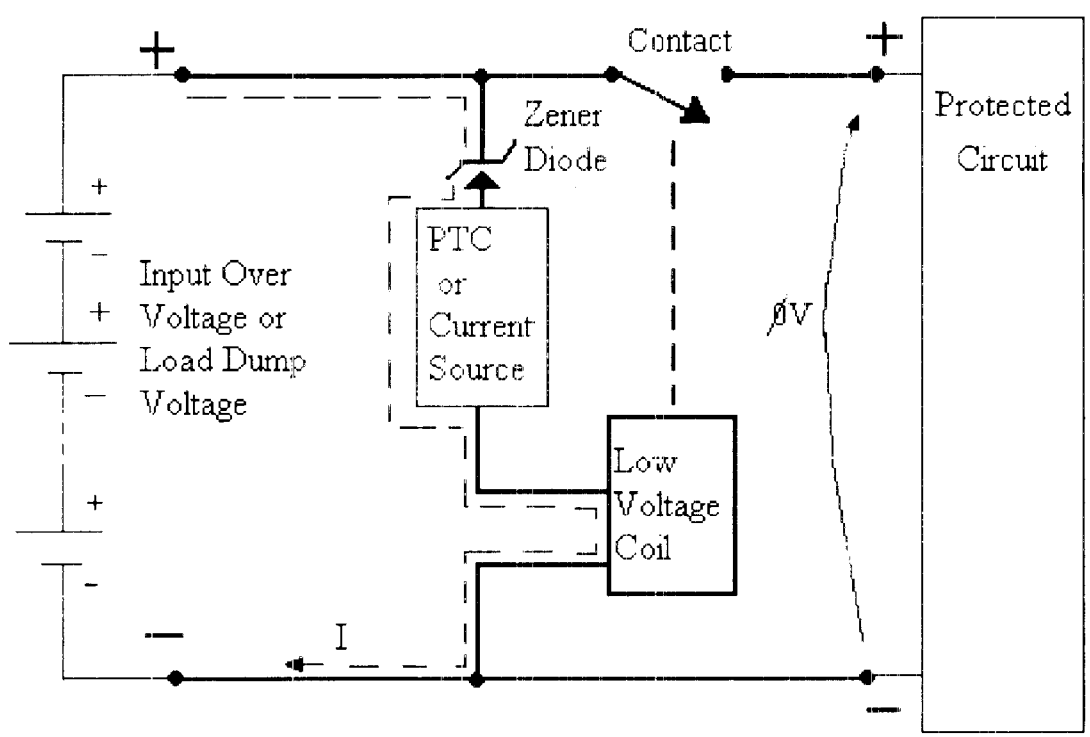
FIG. 6 illustrates the circuit diagram of FIG. 5 wherein the circuit is exposed to an over voltage or load dump voltage.

An embodiment of the present invention provides an inexpensive solution to the over voltage and load dump problems and provides excellent protection to devices in the circuit. As shown in FIG. 5, a Zener diode with suitable operating voltage may be inserted in series with the relay in place of a traditional diode. In this fashion, when the relay becomes exposed to a reverse battery condition, the Zener diode conducts like a traditional diode thereby actuating the relay and protecting the load. That is, the relay is energized, the contact is opened and current is interrupted so that it does not flow through the remainder of the circuit. When the circuit is operating under a normal battery condition, the Zener diode does not conduct, the relay is not energized and the contact remains closed so as to feed current to the load. If an over voltage or load dump occurs, as shown in FIG. 6, voltage increases to exceed the Zener voltage of the diode, thereby forcing the diode to conduct and thus actuating the relay. Accordingly, the contact is opened and the remainder of the circuit is protected. When the voltage goes back to the regular level, the circuit returns to normal operation, the Zener diode ceases to conduct, the relay is no longer energized and the contact is again closed. The PTC or current source shown in FIG. 5 is optional, but should be used if needed to prevent overheating.

It is contemplated that this invention may be self-contained in a device that can be directly assemble into a printed circuit board of an electronic module or the device could easily be mounted in a fuse box of the vehicle such that it is in a circuit with several modules, thus protecting them. As a stand-alone device, if necessary, it would be easily replaceable. This device is useful to protect all types of electronic and electric modules, not only those equipped with power MOSFET's, against reverse battery polarity, over voltages and load dump.

What I claim is:

1. A protective relay comprising input terminals for connection to an external power source; output terminals for connection to a protected circuit or component; a contact connected in series to the input terminal and the output terminal; a reverse bias diode connected to the input terminal; and a relay coil connected in series to the diode and operatively connected to the contact; wherein the diode will energize the relay coil to open the contact and prevent current from reaching the output terminals in the event of excess voltage and reverse polarity situations.

2. The protective relay of claim 1, further comprising means to prevent overheating of the relay coil.

3. The protective relay of claim 2, wherein said means for preventing overheating of the relay coil comprises a positive temperature coefficient resistor operatively connected to said diode and to said relay coil to limit the amount of current flow through said relay coil.

4. The protective relay of claim 2, wherein said means for preventing overheating of the relay coil comprises a current source connected in series to said diode and to said relay coil to limit the amount of current flow through said relay coil.

5. The protective relay of claim 1, wherein the protected circuit or component comprises an electronic module.

6. The protective relay of claim 1, wherein said diode comprises a Zener diode.

7. The protective relay of claim 2, wherein said diode comprises a Zener diode.

* * * * *